United States Patent

Behn

[15] 3,651,548

[45] Mar. 28, 1972

[54] CAPACITIVE NETWORK
[72] Inventor: Reinhard Behn, Munich, Germany
[73] Assignee: Siemens Aktiengesellschaft, Berlin and Munich, Germany
[22] Filed: Aug. 3, 1970
[21] Appl. No.: 60,517

[30] Foreign Application Priority Data
Aug. 6, 1969 Germany..................P 19 40 036.3

[52] U.S. Cl............................................29/25.42, 317/261
[51] Int. Cl. ...................................................H01g 13/06
[58] Field of Search..................317/260, 242, 261; 29/25.42

[56] References Cited

UNITED STATES PATENTS 2,526,704  10/1950  Bair....................................317/261 X 3,402,448  9/1968  Heath...............................317/261 X

FOREIGN PATENTS OR APPLICATIONS 1,579,187  7/1969  France.................................317/261

Primary Examiner—E. A. Goldberg
Attorney—Hill, Sherman, Meroni, Gross & Simpson

[57] ABSTRACT

A capacitive network particularly suited for radio frequency shielding is formed as a layer or stack type condenser having a gap cut therein normal to the planes of the layers to divide the structure into stack portions. Adjacent groups of dielectric and metallic coating layers form ranges of capacitance wherein each range includes internal series capacitive circuits interconnected by bridging coatings between the stack sections in accordance with desired capacitance circuit configurations.

3 Claims, 9 Drawing Figures

Patented March 28, 1972 3,651,548

INVENTOR
Reinhard Behn

BY ATTYS.

Patented March 28, 1972

INVENTOR
Reinhard Behn

BY ATTYS.

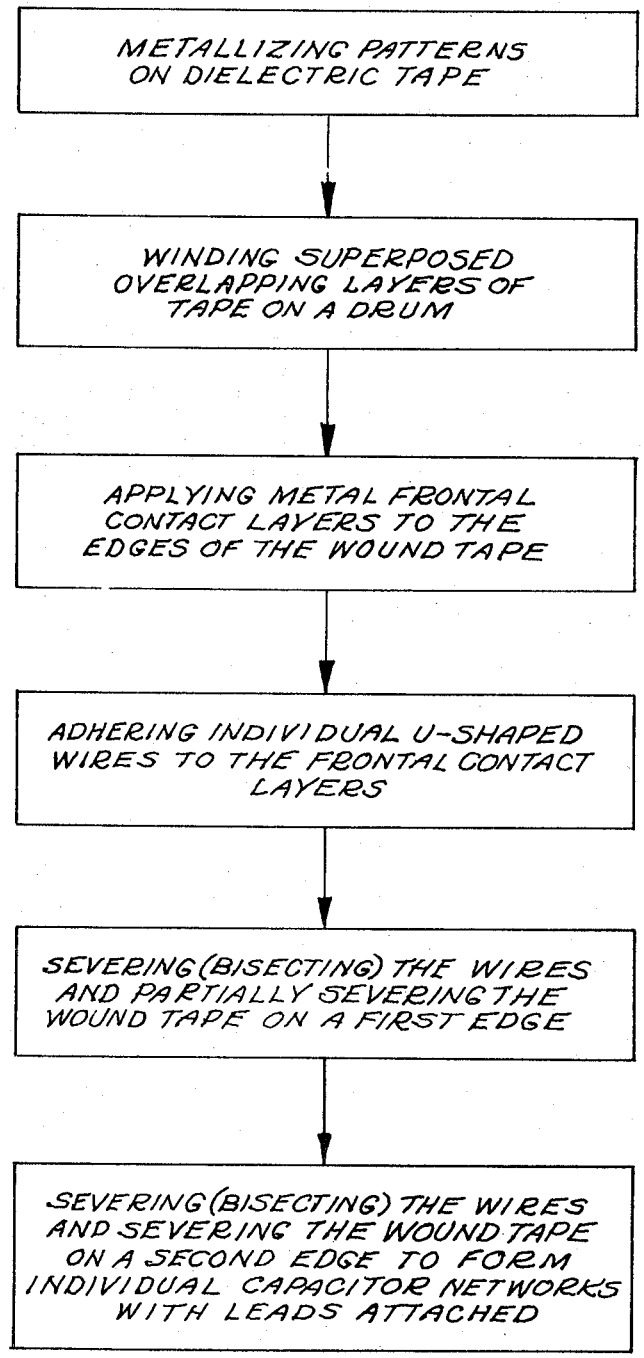

3,651,548

CAPACITIVE NETWORK

BACKGROUND OF THE INVENTION

1. Field of the Invention

The invention relates to a capacitive network wherein an output capacity comprising staggered superposed metallic coatings and dielectric layers is divided by incisions extending transversely at least over the entire width of the covering areas, into the desired network configuration.

X–Y radio-shielding condensers are used whereever the danger exists that a defect, for example a disruptive charge could produce a life-endangering electric shock. Although self-healing condensers have become popular in almost all areas of electrical engineering because of their small dimensions and good electrical properties, so far there has been no practical design of using such condensers as X–Y radio-shielding condensers.

2. Description of the Prior Art

The prior art recognizes, in general, a capacitive network where an output condenser is divided into the desired network configuration by incisions.

The primary object of the present invention is to provide a condenser construction with self-healing metallic coatings which can be used on X–Y radio-shielding condenser.

SUMMARY OF THE INVENTION

According to the invention the above object is realized by the fact that the output capacity comprises two superposed ranges and an incision, that both ranges comprise internal circuits in series of capacities placed on both sides of the incision, interconnected by metallic coating bridges located outside said incision, that the series capacities in the one range are contacted at the frontal surfaces separated from each other by the incision with the outer connecting members placed in the same plane that the series capacities located in the other range are galvanically connected at the frontal surfaces with the series capacities of the first range contacted there and that on the uncut frontal surface located opposite these frontal surfaces the series capacities are provided in the second range of the metallic coating bridges with an exterior connecting member.

The condenser according to the invention may comprise dielectric foils metallized on both sides, with nonmetallized dielectric foils interposed, or it may comprise unilaterally metallized dielectric foils. Depending on the number of the internal series connections, the metallic coating bridges are arranged in one each of the types of metallic coating of both ranges.

The frontal edges of the dielectric foils as used herein means the edges located in the surfaces on which the frontal contact layers are applied.

A condenser according to the invention can be produced in a simple manner in that the metallized dielectric foils are coiled in layers on a disk or drum with a large diameter into a master condenser. Then both frontal surfaces of the master condenser are provided with contact metal layers on the entire side. The master condenser is then divided into the individual output capacities, which are advantageously provided with incisions in the same operation.

The production cost of the condenser according to the invention can be reduced further by coiling several master condensers, separated by separating layers, superposed on the disk or pulley and/or drum.

BRIEF DESCRIPTION OF THE DRAWINGS

Other objects, features and advantages of the invention will be best understood from the following detailed description taken in conjunction with the accompanying drawings, in which:

FIG. 9 is a flow chart describing the method of practicing the present invention.

DESCRIPTION OF THE PREFERRED EMBODIMENTS

Figure 1:
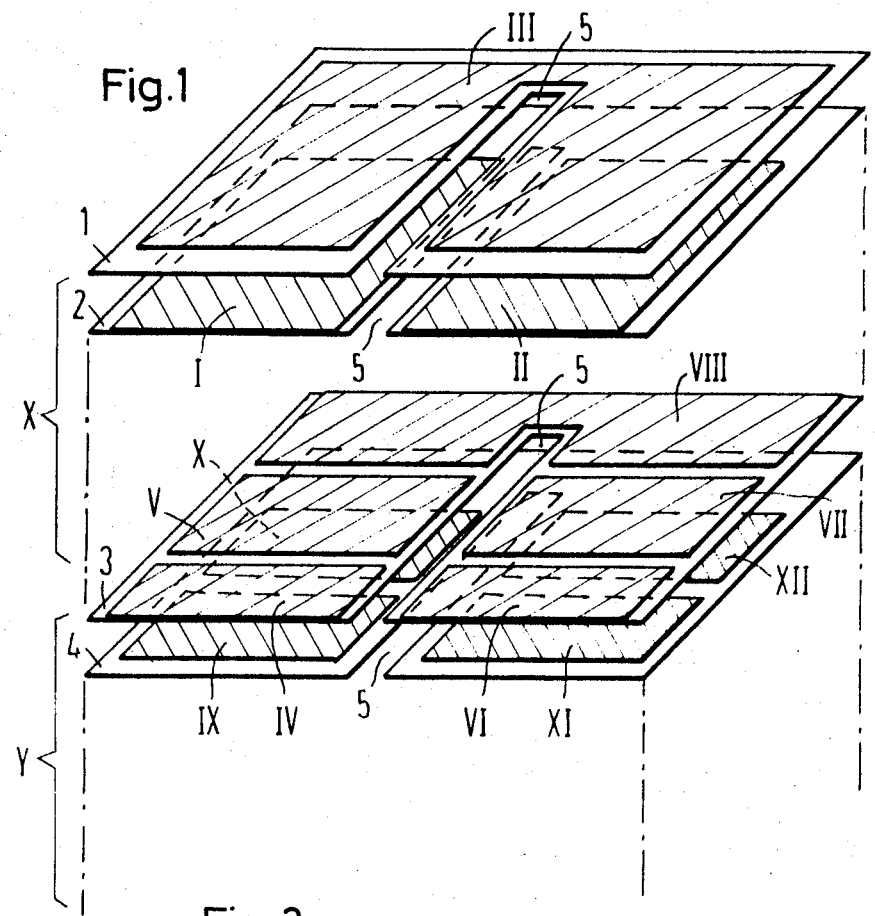
FIG. 1 shows a condenser according to the invention in perspective with respect to both ranges.

A condenser according to the invention is shown in perspective in FIG. 1. The condenser consists of rectangular superposed unilaterally metallized dielectric platelets or foils 1, 2, 3, 4. In this case the condenser structure comprises four different metallic coating arrangements. The structure in FIG. 1 comprises the two coating ranges X and Y. Range X is composed of the metallized dielectric foils 1 and 2 corresponding to the metallized dielectric foils in FIGS. 2 and 3. The coating range Y is constructed from the metallized dielectric foils 4 and 5 corresponding to the metallized foils in FIGS. 4 and 5. Range X represents the X condenser and range Y represents two Y condensers.

The metallic coats on the dielectricum foils in FIGS. 2-5, identified with I to XII and whose areas are shown hatched will generally not extend as far as the edges of the dielectric foils to avoid short circuits between the stacked and superposed foils. Only the metallic coats I and II in FIG. 2 and IV and VI in FIG. 4 reach as far as the frontal edges B and/or C which in the finished condenser are in the same frontal surface, and the metallic coat VIII on the dielectric foil of FIG. 4 reaches to the opposite frontal edge A. Consequently, frontal contact surfaces can be applied on the condenser and the metallic coats can be connected galvanically with external feed members. The frontal contact layers are advantageously applied already to the completed output condenser.

Figure 2:
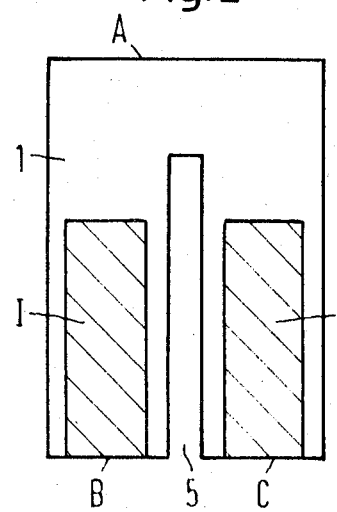
FIGS. 2 and 3 illustrate metallized dielectric foils of which the one range of the condenser according to the invention is constructed.
Figure 3:
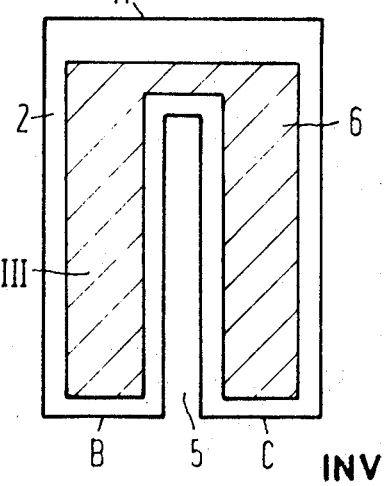
Figure 6:
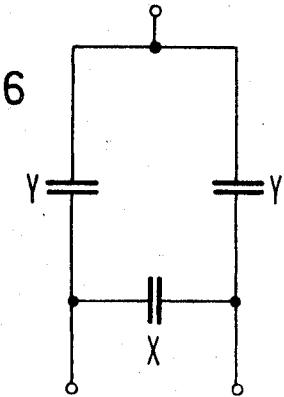
FIGS. 6 to 8 illustrate circuits of capacitive networks accomplished by the design according to the invention

If the dielectric foils of FIGS. 2 and 3 are superposed so that they cover, they form the X range in FIG. 1 representing a series circuit of two condensers. A condenser is produced by electrical contacting corresponding to the X condenser in FIGS. 6 to 8. The desired capacity of this condenser can be produced by metallized dielectric foils according to FIGS. 2 and 3 which are alternately superposed.

Moreover, the capacity can be varied in the X range by the number of internal series circuits. The inner series circuits are accomplished by a number of insulating strips extending parallel to the frontal edges and dividing the metallizing into individual coating strips. The metallizing strips of foils 1 and 2 alternately overlap thereby producing an internal circuit in series. Depending on the number of internal series circuits, the coating bridges 6 are either on foil 1 or on foil 2.

Figure 4:
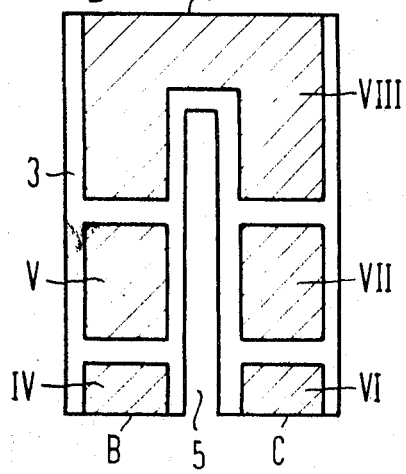
FIGS. 4 and 5 illustrate metallized dielectric foils of which the other range of the condenser according to the invention is constructed.
Figure 5:
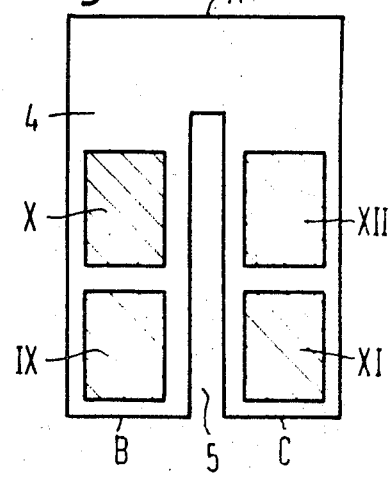
Figure 7:
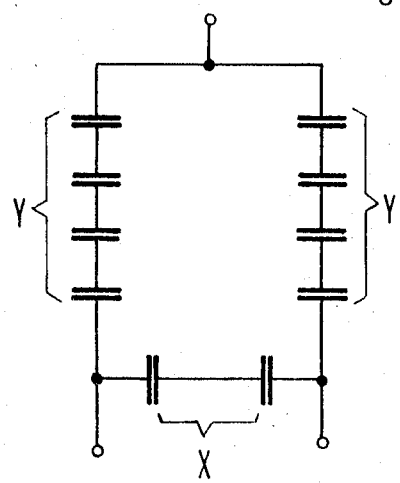
Figure 8:
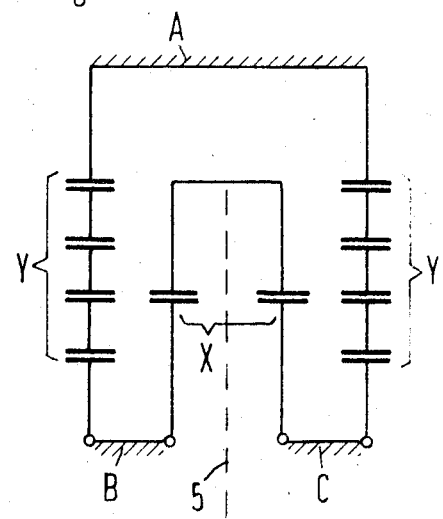

Another series circuit of condensers corresponding to the Y range of FIG. 1 is produced analogously by superposition of the unilaterally metallized dielectric foils in FIGS. 4 and 5. Thereby, the coast IV, VI, VIII of the metallized dielectric foil in FIG. 4 extending as far as the front edges are siezed by front contact surfaces applied over the entire surface at frontal surfaces A, B, C, in FIG. 4. The metallic coatings X and XIII on the dielectric foil 4 of FIG. 5 partly overlap, particularly about half each over the coating V and the coating part located on one side of the incision 5 of coating VIII and also the coating VII of the dielectric foil 3 and the coating portion located on the other side of the incision of coating VIII of the dielectric foil 3. Coatings X and IX and XII and XI of the dielectric foil 4. The overlapping of the individual coatings is shown in perspective in FIG. 1. This results in a quadruple series circuit with the aid of coatings IV, V, VIII and IX, X and another series circuit by coatings VI, VII, VIII and XI, XII. These two quadruple series circuits shown in FIGS. 7 and 8 represent two condensers as shown schematically for example in FIG. 6. These condensers are shorted by the front contact layer on the front surface A and the coatings VIII placed on the dielectric foils 3 in relation to each other.

Even in the Y range the coating bridges 7 are placed, depending on the number of internal series circuits in this area either on the dielectric foils 3 or the dielectric foils 4.

According to the invention the design of the X range and of the Y range of the condenser, the ranges are connected at the frontal surfaces B and C via the frontal contact layers on the frontal surfaces B and C. Both internal series circuits produced by superposition of the metallized dielectric foils of FIGS. 4 and 5 correspond in their circuit arrangement to the U capacitors of FIGS. 7 and 8. The capacity of the Y capacitors can be determined by selecting the number of layers of the superposed dielectricum foils of FIGS. 4 and 5.

The frontal contact layers on the frontal surfaces A, B and C are provided with outer connecting elements. The connecting member at the frontal contact layer on surface A is grounded and the connecting members at the frontal contact layers of the surfaces B and C are connected to the phase and/or the zero conductor.

A particularly simple method for producing such layered condensers proved to wind metallized dielectric tapes rangewise on a disk or drum to form a large master capacitor, and to cut from this master coil the output capacities. The foil length edges thereby correspond to the length of the frontal surfaces A and/or B and C. It is possible to wind first the X and then the Y range or vice versa. It is advantageous thereby to coil master reels on top of each other, separated by partition panels. The superposed master coils are then divided into original or output capacities for example by sawing across the coil. With one winding process a large number of output capacities is then obtained.

The master coils are provided at the frontal surfaces over the entire area with front contact metal surfaces. No undesired shorts can result at the frontal surfaces because the metallized dielectric foils of FIGS. 3 and 5 show at the frontal edges uncoated strips. The metallized dielectric foils according to FIG. 2 show at the frontal edge A opposite the frontal surface B and C, from which incision (slot) 5 originates, likewise uncoated strips. The intersecting planes caused by dividing the master coils into output capacities are placed preferably orthogonally to the direction of the foil length of the master coils. The incision 5 and the separation of the master coils into output capacities is accomplished by sawing in for example. The incision 5 is thereby in a plane orthogonal to the longitudinal direction approximately in the center between both intersecting planes. The finished condenser according to the invention then represents a network configuration according to the circuits in FIGS. 6, 7 and 8. This condenser may be used as an X-Y radio shielding condenser.

The sawing produces the necessary insulation edges on the metallized dielectric foils in the range of the bisecting planes and the incision. These insulating edges show up in all four kinds of the dielectric foils and are necessary to avoid undesired shorts between the metallic coatings. It has been discovered that upon incising into metallized, particularly thermoplastic synthetic foils, insulation edges are produced in the vicinity of the cutting edge according to the German Pat. application No. P 17 64 549.7. These insulating edges also are produced when residual solvents are present. Consequently dielectric foils metallized over the entire surface and having only on one frontal edge (FIG. 2) an uncoated edge or metal free marginal strips at both longitudinal edges (FIG. 3) may be used for the condenser according to the invention. The metallized dielectric foils shown in FIG. 4 result from foils metallized over the entire surface which show metal-free strips in the metal coating parallel to the longitudinal edges and whose metallization extends to the longitudinal edge. The dielectric foils of FIG. 5 result from dielectric foils metallized over the entire surface having both within the coating and at both longitudinal edges metal-free strips parallel to the longitudinal edges. The production of such dielectricum strips provided with metallizations is possible on the condenser technique without any problem.

The condensers according to the invention can be contacted simply in the following manner. The output capacities are arranged at a distance from each other between two parallel extending wires, adhering to said wires with their frontal sides already provided with contact layers. The wires are electrically conductively connected with the front contact layers, for example by soldering or welding. The wire adhering to the front sides where the incisions 5 will produce both frontal surfaces B and C is connected in each case by at least two welding or soldering places to the front contact layers. Following a connection of the wires with the front contact layers the output capacitors are sawed in or incised from the front surface from the front side where both front surface areas B and C are to be produced, whereby the adhering wire likewise is cut through. The wires are separated at points between output capacities arranged at a distance from each other and the condenser according to the invention is finished.

Moreover, the connecting wires can be applied to the master capacitor provided with front contact layer prior to it being divided into individual capacities. A U-shaped connecting wire is thereby applied to the front side on which both front surfaces B and C are to be produced. This wire is cut through upon application of the incision 5 approximately in the center of the transverse leg adhering to the front surface.

The radio-shielding condenser may be installed in a housing for protection against contact. It is expedient to pour the finished condenser according to the invention in the housing.

The condenser according to the invention can be built with all foils customary in the condenser technique for self-healing condensers. Polycarbonate and polyethylene terephthalate foils are particularly applicable for the dielectric foils. The self-healing coats consist advantageously of aluminum. The condenser according to the invention can be improved further by superposing alternately metallized polycarbonate and polyethylene terephthalate foils.

So that the sprayed-on front contact layers will have an improved mechanical hold, the dielectric foils of FIG. 3 and 5 are slightly more narrow than the foils of FIGS. 2 and 4. This creates a staggering of the foils at the frontal surfaces.

The series circuit of the radio-shielding condensers according to the invention produces adequate safety and passes the high test requirements demanded of condensers protected against contact. In the Y condenser according to the invention the number of series circuits also may be more or less than four. Likewise the number of series circuits in the X condenser may be more than two. In case of an odd number of the inner series circuits for the Y condenser the coatings to be contacted at frontal surface A are on a dielectric foil other than the coatings on front surfaces B and C to be contacted. To avoid sparkovers at the contact line between the X and Y capacitor as far as possible, insulation layers are placed between the X and Y area. This can be accomplished by winding after the coiling of the X or Y range on the master coil some windings of dielectric foils of FIG. 5.

The invention produces a capacitor for shock protection results with high voltage and temperature consistence and immunity against humidity. Furthermore, the invention provides for a simple method of manufacturing the shock protection capacitor with regerable coatings.

Many changes and modifications within the scope of the invention will become apparent to those skilled in the art, and it is to be understood that I intend to include within the patent warranted hereon, all such changes and modifications as may reasonably and properly be included within the scope of my contribution to the art.

I claim:

1. A method of making capacitive networks comprising the steps of metallizing a dielectric tape with patterns of metallic coatings some of which extend to a first edge tape with and others of which extend to the second edge of the tape, overlappingly winding the tape on a drum, applying metallic frontal contact layers to the wound edges of the tapes to contact the respective metallic coatings at the edges, adhering contact wires at points along the frontal layers, severing the wire and severing part way through the wound tape between points on the first edge of the wound tape, and severing the wire on the second edge and severing the entire tape to form individual capacitor networks with leads attached.

2. A method according to claim 2, wherein, further defined by winding a plurality of metallized tapes in superposition, and metallically coating, adhering and severing with respect to all of the wound edges.

3. The method according to claim 1, wherein the step of adhering contact wires includes the step of individually adhering U-shaped contact wires on the frontal layer on the first edge of the tape and the step of severing the wire is further defined as bisecting the U-shaped wires.

* * * * *